United States Patent

Barron

Patent Number: 5,615,708
Date of Patent: Apr. 1, 1997

[54] FLOW CONTROL VALVE WITH NON-PLUGGING MULTI-STAGE VALVE TRIM

[75] Inventor: Kimball R. Barron, Marshalltown, Iowa

[73] Assignee: Fisher Controls International, Inc., Clayton, Mo.

[21] Appl. No.: 546,945

[22] Filed: Oct. 23, 1995

[51] Int. Cl.$^6$ ............................................... F16K 47/08
[52] U.S. Cl. ........................... 137/625.3; 137/625.38; 251/127
[58] Field of Search ..................... 137/625.3, 625.38; 251/127

[56] References Cited

U.S. PATENT DOCUMENTS

| | | | |
|---|---|---|---|
| 2,832,371 | 4/1958 | La Bour | 137/504 |
| 3,294,174 | 12/1966 | Vincent | 137/625.38 X |
| 3,482,604 | 12/1969 | Fleckenstein et al. | 137/624.2 |
| 3,485,474 | 12/1969 | Baumann | 251/121 |
| 3,637,188 | 1/1972 | Ung | 251/120 |
| 3,715,098 | 2/1973 | Baumann | 251/121 |
| 3,776,278 | 12/1973 | Allen | 137/625.38 |
| 3,880,399 | 4/1975 | Luthe | 251/121 |
| 4,634,095 | 1/1987 | Taylor | 251/121 |
| 5,018,703 | 5/1991 | Goode | 251/127 |
| 5,113,908 | 5/1992 | Steinke | 137/625.3 |
| 5,133,383 | 7/1992 | King | 137/625.3 |
| 5,351,717 | 10/1994 | Saito | 137/625.3 X |
| 5,415,202 | 5/1995 | Shiffler et al. | 137/625.3 |
| 5,497,801 | 3/1996 | Kusunose et al. | 251/127 X |

*Primary Examiner*—Gerald A. Michalsky
*Attorney, Agent, or Firm*—Marshall, O'Toole, Gerstein, Murray & Borun

[57] ABSTRACT

A fluid control valve suitable for pressure reducing service. A valve is provided with a fixed cage member containing an internal passageway communicating with a cage inlet and outlet. A movable valve plug is slidably mounted within the cage member and contains an internal plug passageway. A fluid flow path is provided through the plug assembly and through the cage internal passageway so that multi-stages of pressure reduction are obtained. The provided fluid flow includes a combination of axial, outwardly radial, inwardly radial flows and a flow through the internal passageway of the plug assembly in order to obtain the required multiple pressure drops. The restricted flow passages at each stage are large enough in size so that any particulate in the fluid will pass out without plugging up the passages in the valve trim.

8 Claims, 4 Drawing Sheets

FLOW CONTROL VALVE WITH NON-PLUGGING MULTI-STAGE VALVE TRIM

This invention relates generally to fluid flow valves which are continuously adjustable from a closed to an open position to provide a quantity of fluid flow which is a function of valve position. More particularly, this invention relates to flow control valve trim for use in a fluid system in which high pressure drops must be achieved across a valve without concomitant cavitation, noise generation and physical damage to a valve part and to provide such a reliable pressure reducing flow control valve where the process fluids may contain particulates of a large size.

BACKGROUND OF THE INVENTION

In fluid flow control systems it is frequently required to reduce fluid pressures by several hundreds of pounds per square inch in order to maintain flow control. Pressure drops of this magnitude are commonly accompanied by cavitation and generation of audible noise. Generally, cavitation will occur in a liquid system when the pressure is reduced below the vapor pressure of the liquid, at which time vapor bubbles form in the liquid. When, as in the case of a control valve, throttling is followed by pressure recovery, these vapor bubbles collapse or implode, generating shock waves in the liquid. These shock waves commonly result in severe erosion, or "cavitation damage," to valve parts when conventional plug and orifice valves are employed. Such damage, of course, leads to premature valve failure, having serious economic consequence.

Heretofore it has been common to treat the problems of cavitation, noise generation and metal erosion in fluid flow control valves in several ways.

Reference may be made for instance to the following U.S. Patents of interest: U.S. Pat. Nos. 3,637,188; 3,715,098; 3,485,474; 3,776,278; 3,880,399; 4,634,095; 2,832,371; 3,482,604; 5,018,703; 5,113,908; and 5,415,202.

Generally, such references illustrate that the use of multi-stage valve trim is in common practice in high pressure drop, pressure reducing valve situations when there is a possibility of cavitation. Many of these references provide a multi-stage valve trim with a lengthy fluid flow path of tortuous or labyrinthine configuration within the internal elements of a valve and wherein most of the reference trims use small size flow passages and tight clearances between the parts through which the flow must pass. In situations where the process fluid is clean, the small passages work well and provide the desired reduction in pressure while reducing the risks of any cavitation occurring.

However, in certain situations it is required to utilize a pressure reducing fluid control valve where the process fluid is not clean and otherwise may contain particulates in the flow stream of relatively large sizes, and at times larger in size than the small flow passages in the pressure reducing valve. Using currently available pressure reducing valves in such severe circumstances can lead to the small flow passages becoming plugged by the particulate material in the flow stream. Such plugged passages reduce the flow capacity of the valve and lead to valve trim damage from the large size particulates flowing in the fluid stream. Furthermore, if the valve trim with small sized flow passages is replaced by a trim stage having larger size flow passages because of the plugging conditions, this reduces the amount of pressure drop to be supplied by the valve and also can lead to cavitation problems.

It is therefore desired to provide a fluid control valve with multiple stages of pressure reduction and which can reliably operate under severe flow conditions where the fluid may contain entrained particulates of large size.

SUMMARY OF THE INVENTION

In accordance with the principles of the present invention, there is provided a fluid flow control valve capable of sustaining high pressure differentials even under conditions where the process fluid contains large size entrained particles.

The present invention provides a multi-stage flow control valve utilizing the unique combination of axial, outwardly radial, inwardly radial flow to accomplish the required multiple pressure drops. The restricted flow passages at each pressure reducing stage corresponding to the respective rapid changes in flow direction from axial to outwardly radial and inwardly radial flow are provided large enough in size so that any particulate entrained in the process fluid will pass through the valve without plugging up the flow passages in the valve trim. This further enables the valve trim to be self-flushing.

In a preferred embodiment of the invention, there is provided a high pressure flow control valve having a valve body with an inlet, an outlet and a central passageway connecting the inlet and outlet. The cage member is received within the passageway and cooperates with the passageway to define a center bore. The cage member includes an inlet communicating with the valve body inlet, an outlet communicating with the valve body outlet, and an internal passageway within the cage member communicating between the cage member inlet and the cage member outlet.

A valve plug is reciprocably received within and movably engages the valve central bore and the valve plug includes a plurality of plug sealing surfaces and intermediate spaced openings leading to internal plug passageways defined within the valve plug. The valve plug is selectively movable to enable the plug sealing surfaces to sealingly engage the cage member inlet and outlet so as to block fluid flow through the valve body passageway in the valve closed position. When the valve plug is selectively moved to the valve open position, this enables the valve plug sealing surfaces to disengage from the cage member inlet and outlet so as to enable fluid flow through the valve body passageway.

In the valve open position the cage member inlet and outlets register with the valve plug openings to enable the fluid flow to define a combination of flow paths through the cage member inlet and outlets and generally through the plug center, i.e. through the valve plug openings and the internal plug passageways. The unique flow path is defined as a combination of substantially right angle reversing flow paths including axially along and within the valve plug internal plug passageway and axially along the cage member internal passageway, outwardly radially between the valve plug opening and the cage member, and inwardly radially between the cage member and the valve plug opening to provide a series of fluid flow throttling stages. The cage member inlet and outlets as well as the valve plug openings provide restricted flow passages at each stage and are made sufficiently large enough in size so that any particulate in the fluid will pass through without plugging up the passages.

In a constructed embodiment of the invention, a valve plug assembly is provided having a central plug member with respective plug sleeves at either end and formed of a cylindrical member. Each cylindrical plug sleeve is open at one end and contains a defined internal plug passageway with five symmetrically spaced large openings through the cylinder walls serving as outlets for the plug passageway. The two cylindrical plug sleeves of the valve assembly register with a cage assembly formed of a lower-outer cage and seat ring and a lower-inner cage followed by an upper cage member. The lower-inner cage includes a series of five symmetrically located large openings in the cylindrical surface as well as a series of six symmetrically displaced upper windows around a cylindrical surface and through the lower-inner cage member.

With the lower inner cage placed within the lower-outer cage and seat ring, there is defined an interior passageway between these two cage members which extends from an input between the end of the lower inner cage and a bottom wall of the lower-outer cage, to an outlet through the lower series of windows or openings in the lower-inner cage member. The upper series of windows in the lower-inner cage member are in direct communication with the valve body outlet. Placing the valve plug assembly for slidable guidance within the surrounding upper cage and the lower-inner cage, locates the lower plug sleeve in a fluid blocking position across the lower-inner cage lower windows while also blocking the inlet to the cage internal passageway. Also, the upper plug sleeve blocks the upper window of the lower-inner cage. A seat surface is provided at the bottom of the lower-outer cage and seat ring for fluid sealing engagement with the bottom of the valve plug. When the valve is in the closed position, fluid flow is prevented between the valve body inlet and the valve body outlet.

When the valve plug assembly is moved so that the plug is moved away from the seat at the valve body inlet, fluid can enter a large opening between the plug bottom and the bottom of the seat ring, proceed axially within the internal plug passageway defined within the lower plug sleeve, then turning outwardly radially to exit the plug sleeve through the provided large window openings, and through the cage member inlet to the cage member internal passageway. Fluid then extends axially within the cage member internal passageway and exits inwardly radially through the large windows in the lower-inner cage to again enter and extend axially within the upper plug sleeve and finally exiting outwardly radially through the large windows in the upper plug sleeve and the large upper windows of the lower-inner cage to thereby pass into the valve body outlet.

This constructed embodiment of the invention provides a throttling valve with three stages of pressure reduction, each stage occurring when the fluid is forced to drastically change direction from axial to outwardly radially and again from axially to inwardly radially, and finally from axially to outwardly radially to the outlet. There is thus provided a three stage throttling valve with an upwardly flow valve trim.

It is understood of course that the same principles can be applied to more or less pressure reducing stages and to having a downwardly flowing valve trim if desired. Using the principles of the invention, for instance, a four stage throttling valve has been constructed with a flow down valve trim.

BRIEF DESCRIPTION OF THE DRAWINGS

The features of this invention which are believed to be novel are set forth with particularity in the appended claims. The invention may be best understood by reference to the following description taken in conjunction with the accompanying drawings, in which like reference numerals identify like elements in the several figures in which:

DETAILED DESCRIPTION

Figure 1:
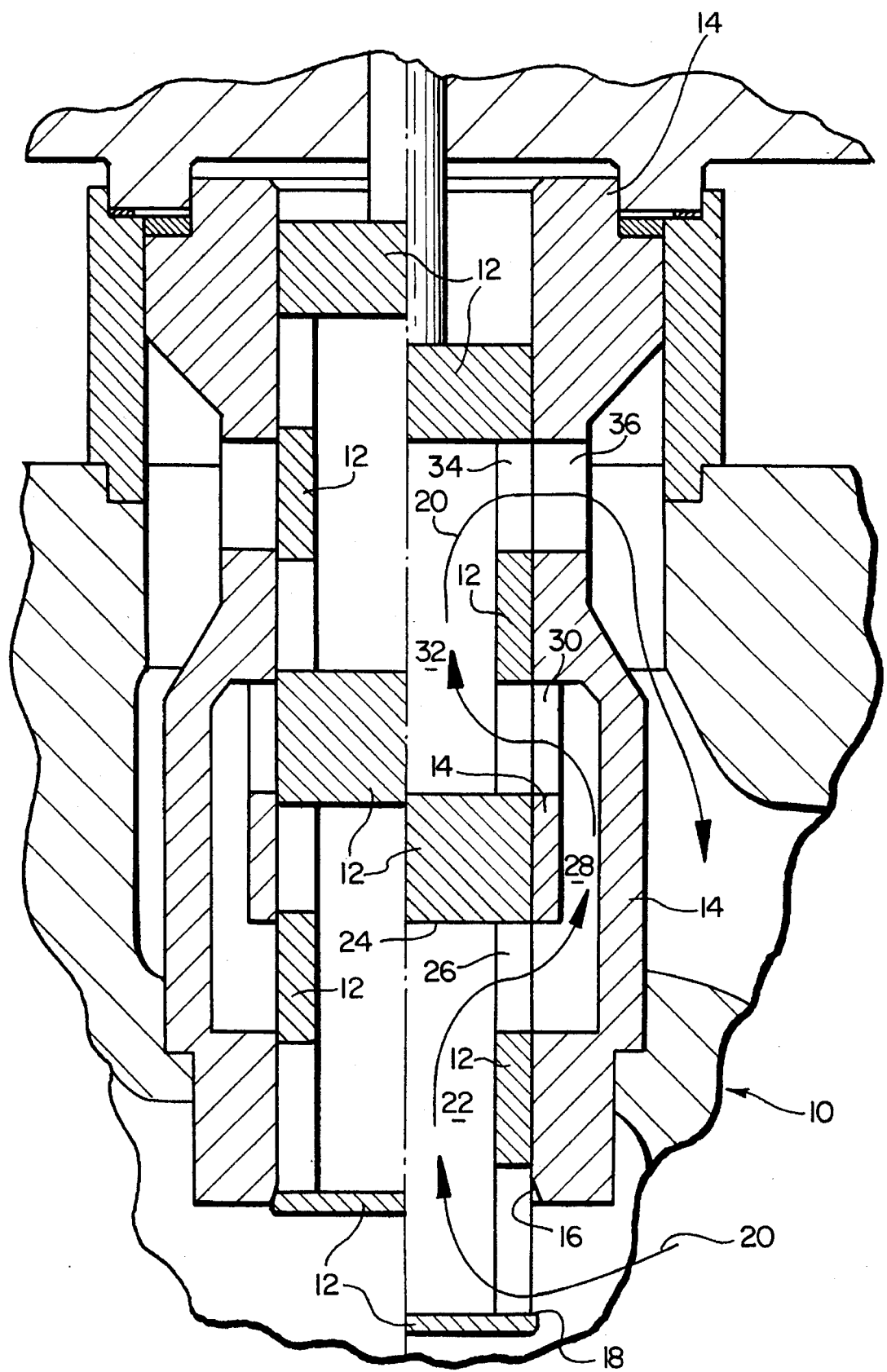
FIG. 1 is a schematic view of a valve trim in accordance with the present invention.
Figure 2:
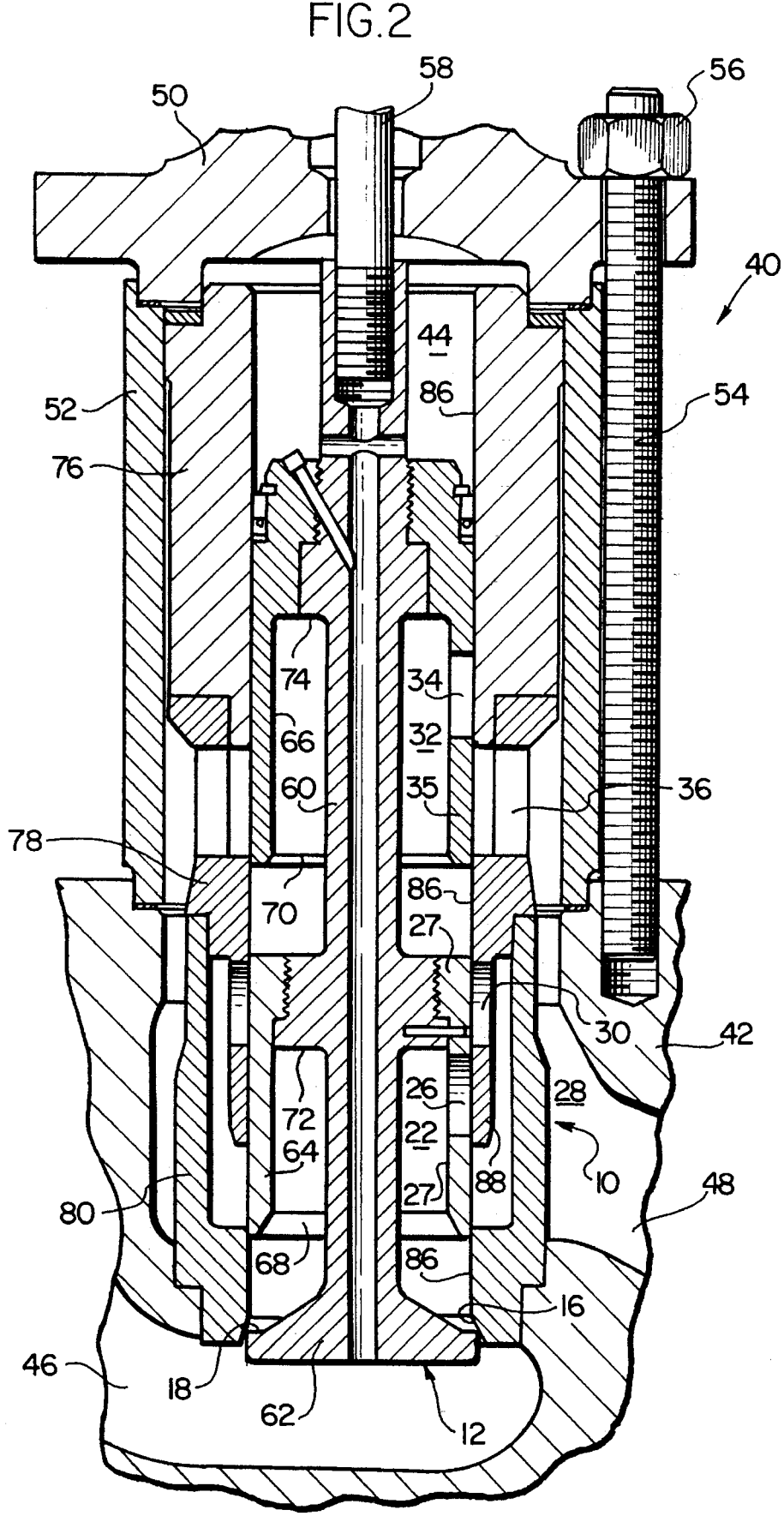
FIG. 2 is a sectional view illustrating a fluid control valve with a three stage valve trim in accordance with the present invention.
Figure 3:
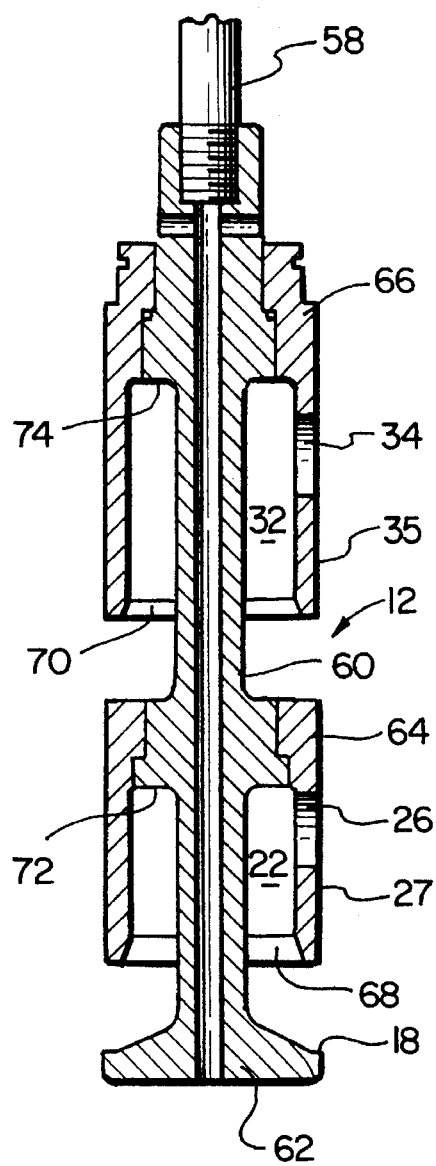
FIG. 3 is a sectional view illustrating the valve plug assembly of the valve trim of FIG. 2.
Figure 4:
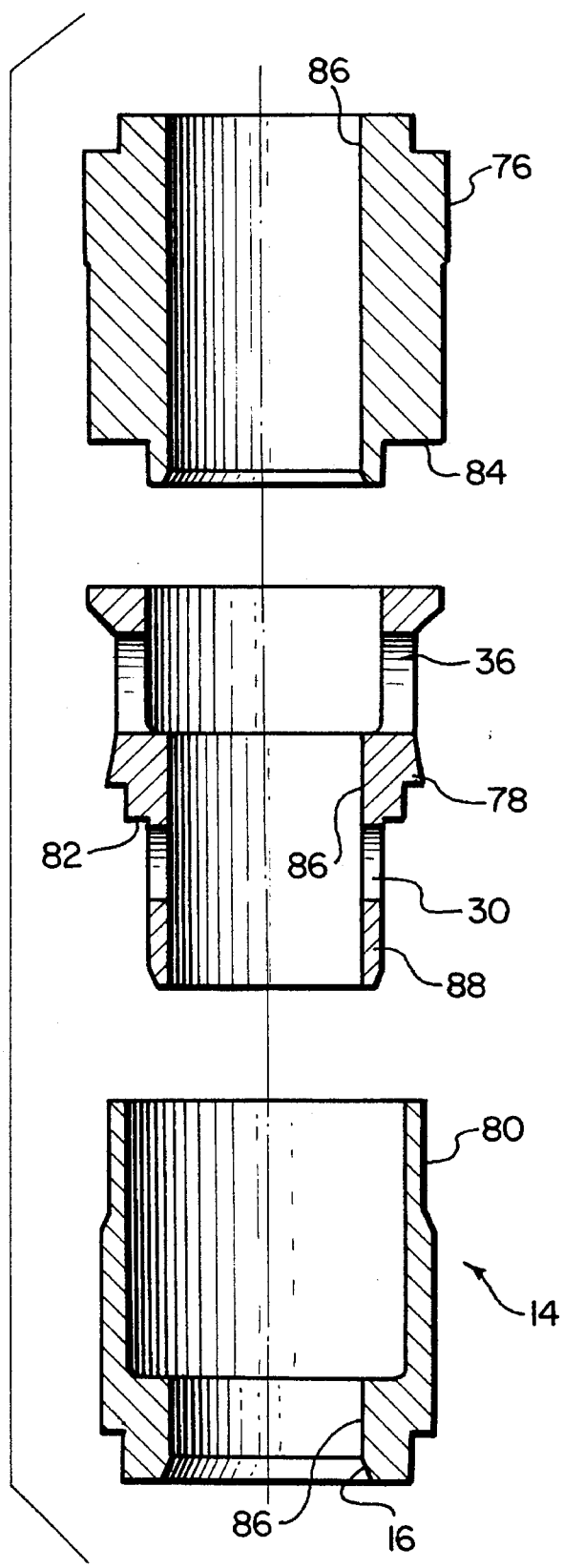
FIG. 4 is an exploded view of the three-piece cage assembly of the valve trim of FIG. 2.

Referring to the drawings, the present invention will be described initially with respect to an operational concept as shown in FIG. 1 and thereafter with respect to FIGS. 2–4 illustrating a preferred embodiment of the invention. Finally, a description of FIG. 5 will hereinafter be given to more conveniently describe the manner in which the preferred embodiment of the invention carries out the operational concept of FIG. 1.

Referring now to FIG. 1, there is illustrated a multi-stage valve trim 10 having a valve plug assembly 12 mounted for reciprocating movement within a surrounding cage 14. The cage 14 includes a flow inlet seat 16 for engagement with a sealing surface 18 on the valve plug. For convenience in describing the unique flow through the valve for providing the pressure reducing stages, the left side of the valve trim 10 shown in FIG. 1 is in the closed position whereas the portion of the valve trim on the right-hand side of the centerline is shown in the full open position. It is to be understood that this illustration is for convenience only and that the valve plug assembly 12 is either open on both sides of the centerline or closed on both sides of the centerline.

Fluid flow through the valve is shown by the reference line 20. The multi-stage valve trim 10 provides a unique combination of axial, outwardly radial, inwardly radial and flow through the center of the valve plug assembly 12 to take the required multiple pressure drops.

As illustrated in FIG. 1, the fluid flow represented by the reference numeral 20 enters into the center of the valve plug assembly 12 with an inwardly radial path. The fluid then turns and is required to flow through the center of the valve plug 12 along an axial path within an annular chamber 22 defined within the valve plug. The center of the valve plug is blocked off at wall 24 so that the fluid is now forced to turn and flow outwardly radially through a set of flow passages 26 that are sized due to restrictions of the flow. The flow is then allowed to enter the cage 14 and to expand into an annular chamber 28 defined within the cage 14 and around the outside of the valve plug 12. After passing into the annular chamber 28, the fluid will turn and flow along an axial path within chamber 28 until it is forced to turn again and pass through another set of restricted flow passages 30 in an inwardly radial path back into the center of the valve plug 12. The fluid can now once again expand, turn and flow along an axial path through the center of the valve plug in an annular inner chamber 32 defined within the plug. The fluid 20 will now turn again and flow outwardly radially through another set of restricted respective flow passages 34, 36 and exits the valve trim and flows into the valve body outlet.

It is understood, of course, that the inwardly radial, axial, and outwardly radial flow path can be repeated as many times as is needed in order to take the required pressure drop. Each one of these inwardly or outwardly radial restrictions and expansions is a pressure reduction stage. These stages can be sized to allow for different percentages of the total pressure drop across the valve to be taken at each stage. The amount of pressure drop to be taken at each stage may need to be changed with different fluids and different total pressure drops. In accordance with standard practice, this can readily be done by changing the flow area of each stage and by adapting the total number of stages used. The flow passage where the fluid first enters the center of the valve plug 12 can be sized to take part of the total pressure drop or can be sized to take very little pressure drop to protect the valve seating surfaces. Variable flow control can be accomplished by stroking the valve plug 12 up or down inside of the cage 14. This will regulate the amount of available flow area.

The principles of the invention as illustrated in FIG. 1 can be used on any liquid flow and will be the most useful in connection with fluids having entrained particulate of a large size. The restricted flow passages at each stage can be made large enough in size so that any particulate that is in the fluid will pass through without plugging up the passages so that the valve trim 10 is self-flushing. Also, the valve trim 10 of the present invention can be used with a balanced or unbalanced valve plug and is compact enough so that in many cases it will be possible to install the valve trim 10 into existing, standard globe valve bodies as well as in angle valve bodies. A constructed valve trim in accordance with this invention can be made from a combination of simple shapes and forms such as bar stock, pipe, plate and tube.

Referring now to FIG. 2, there is illustrated a preferred embodiment of the invention with a three stage valve trim incorporating the principles of the invention shown in FIG. 1. With reference to the assembled sectional view of FIG. 2 and the separate valve elements shown in FIGS. 3 and 4, there is illustrated a fluid flow control valve 40 which includes a valve body 42 having a central passageway 44 communicating between a valve body inlet 46 and a valve body outlet 48. The valve trim 10 is mounted within the valve body central passageway 44 and maintained secured in position by means of a bonnet 50, bonnet spacer 52, and a series of holddown bolts 54 threadably engaging the valve body 42 at one end and maintained securely onto the bonnet 50 by respective nuts 56. A valve stem 58 is securely fastened to the valve plug assembly 12.

Referring now to FIGS. 3 and 4, the details of the valve plug assembly 12 and the cage 14 provided in the valve of FIG. 2 can be more readily seen. The valve plug assembly 12 includes an elongated plug member 60 ending in a plug 62 having a sealing surface 18. A pressure balanced plug is illustrated in FIG. 2, however, the invention is applicable to non-balanced plug situations as well. A lower plug sleeve 64 and an upper plug sleeve 66 are threadably mounted onto suitable shoulders of the plug 60. Each of the plug sleeves are cylindrical in shape and formed in a similar manner having respective openings 68, 70 respective back walls 72, 74 and five respective restricted openings 26, 34 in respective sealing surfaces 27, 35. The plug inner chamber 22 is an internal passageway for the fluid flow and is defined within the lower plug sleeve 64. The plug inner chamber and internal passageway 32 is defined within the upper plug sleeve 66.

As shown in FIG. 4, cage member 14 is formed by three units: an upper cage 76, a lower inner cage 78 and a lower outer cage 80. As shown in the assembled view of FIG. 2, the lower outer cage 80 is mounted within the valve body passageway 44 so as to be adjacent the valve body inlet 46. The lower inner cage 78 has a larger diameter upper portion and a smaller diameter lower portion and includes a shoulder 82 for mounting onto the top ledge of the lower outer cage 80. Similarly, upper cage 76 includes a shoulder 84 for mounting onto the top edge of lower inner cage 78. Assembling cages 76, 78, 80 as shown in FIG. 2 provides a center bore 86 for slidably guiding the valve plug assembly 12. The bottom of the lower outer cage 80 includes the seat 16 for engagement with the plug sealing surface 18.

Lower inner cage 78 includes a lower end 88 which when inserted within the lower outer cage 80 assists in defining the cage inner chamber 28. Five restricted cage outlets 30 are provided symmetrically located around the lower inner cage 78. Six cage outlets 36 are symmetrically located around the upper portion of the lower inner cage 78 to provide substantially unrestricted flow to the valve outlet 48.

In assembling the valve of FIG. 2, the three cage members 76, 78, 80 are initially mounted one on top of the other. The valve plug assembly 12 is then inserted from the bottom of the cage assembly 14, first through the lower outer cage 80 until the plug sealing surface 18 rests against the seat 16. The valve plug assembly 12 and cage assembly 14 is then inserted into the valve body and locked in place through the bonnet spacer 52, bonnet 50 and suitable holddown bolts. If desired, standard anti-rotation pins can be used to securely attach the plug sleeves 64, 66 to the elongated plug member 60.

As seen in FIG. 2, the valve is in the closed position with the sealing surface 18 engaging the seat 16 to prevent fluid flow through the valve from the valve body inlet 46 from reaching the valve body outlet 48. Also, it can be seen that the sealing surface 27 of the lower plug sleeve 64 covers an opening between the lower end of the cage 78 and the bottom of cage 80 at the lower end of the cage inner chamber 28. Sleeve 64 at its upper end also includes the sealing surface 27 which closes off the restricted cage outlet 30 and the upper plug sleeve 66 includes the sealing surface 35 which closes off the cage outlet 36.

Figure 5:
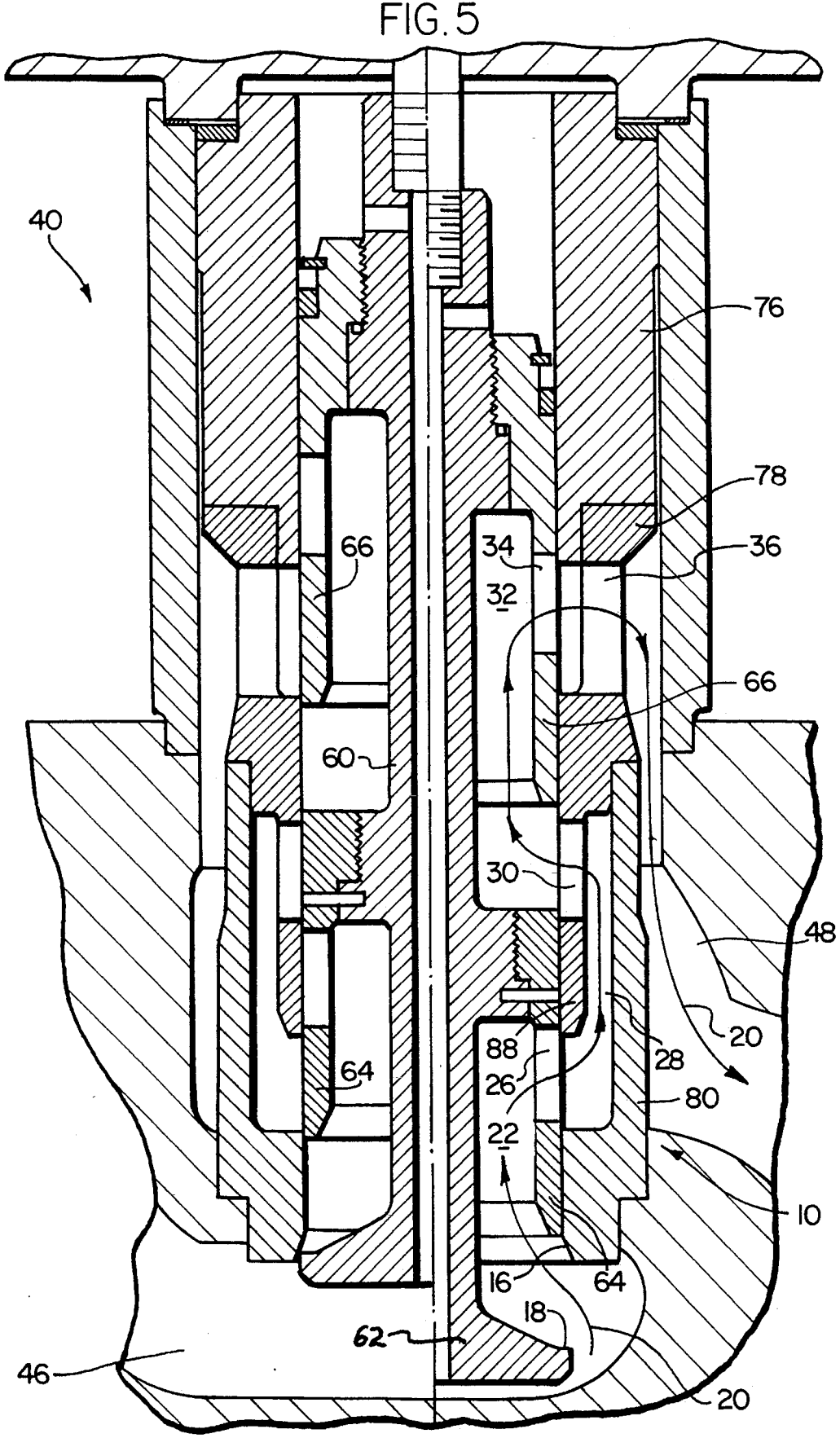
FIG. 5 is a schematic view of the valve of FIG. 2 with half of the valve trim shown in the closed position and the other half of the valve trim shown in the full open position to illustrate the fluid flow through the valve.

FIG. 5 is a schematic illustration of the valve 40 of FIG. 2 useful for describing the flow path through the valve. For convenience of illustration, the portion of the valve trim on the left-hand side of the centerline is shown in the closed position and the portion of the valve trim on the right side of the centerline is shown in the fully opened position. This schematic representation is presented in order to better illustrate the flow path of the fluid flow 20 as it traverses the components of the valve trim 10 in valve 40.

In the fully opened position of the valve shown in FIG. 5, the fluid flow 20 can now travel from the valve body inlet 46 across the open seat 16 so as to extend axially within the plug inner chamber 22 forming the defined internal plug passageway. The fluid flow is now forced outwardly radially through the restricted plug outlet 26 and expands and travels axially in cage inner chamber 28 forming the defined internal cage member passageway, then turning inwardly radially to exit through the restricted cage outlets 30 to again enter into the plug inner chamber 32 of the plug assembly. The fluid flow then expands while travelling axially in the plug inner chamber 32 and then exits outwardly, radially through the restricted plug outlets 34 and the cage outlets 36 to enter the valve body outlet 48.

Rather than the flow up valve shown in FIGS. 2–5, it is to be understood that the principles of the present invention can also be applied to a flow down type valve if desired. In a constructed embodiment of a flow down valve, a four stage pressure reducing valve was constructed containing similar components as illustrated in FIGS. 2–4 and with the valve trim essentially being utilized upside down from the depiction of FIG. 2.

The foregoing detailed description has been given for clearness of understanding only, and no unnecessary limitations should be understood therefrom, as modifications will be obvious to those skilled in the art.

I claim:

1. A high-pressure flow control valve for reducing the flow pressure in multiple pressure throttling stages comprising:

a valve body having an inlet, an outlet, and a central passageway communicating therebetween;

a cage member received within and cooperating with said passageway to define a center bore, a cage member inlet communicating with said valve body inlet, a cage member outlet communicating with said valve body outlet, and a cage member internal passageway communicating said cage member inlet with said cage member outlet;

a valve plug reciprocally received within and movably engaging said cage member center bore and having a plurality of valve plug sealing surfaces and intermediate spaced valve plug restricted flow openings leading to internal plug passageways;

said valve plug selectively movable to enable said plug sealing surfaces to disengage from said cage member inlet and outlet, and to enable said valve plug restricted flow openings to communicate with said cage member inlet and outlet to enable fluid flow through the valve body central passageway; and said cage member inlet and outlets registering with said valve plug restricted flow openings to enable said fluid flow to define a combination of flow paths through the cage member inlet and outlet and the internal plug passageways which are a combination of substantially right angle reversing flow paths wherein each reversing flow path provides flow pressure reduction, said reversing flow paths including axially along said internal plug passageways and said cage member internal passageway, outwardly radially between said valve plug restricted flow openings and said cage member, and inwardly radially between said cage member and said valve plug restricted flow openings to provide a series of fluid flow throttling stages in which the flow path is alternately restricted and expanded in each said reversing flow path, each throttling stage corresponding to said outwardly radial and inwardly radial flow paths providing respective flow pressure reduction in said outward and inward flow paths.

2. A high-pressure flow control valve according to claim 1, wherein said valve plug includes at least one cylindrical sleeve mounted to one valve plug end, said sleeve closed at one sleeve end and open at the other sleeve end to define said internal passageway, and including a sleeve outer surface comprising said plug sealing surfaces and spaced openings.

3. A high-pressure flow control valve according to claim 2, wherein said open sleeve end communicates with said valve body inlet upon opening of the valve.

4. A high-pressure flow control valve according to claim 3, wherein said cage member includes a seat and said valve plug includes a sealing surface for engaging said seat.

5. A high-pressure flow control valve according to claim 2, including a second cylindrical sleeve mounted to the other valve plug end, said second sleeve closed at one sleeve end and open at the other sleeve end to define a respective internal plug passageway, and including a sleeve outer surface comprising respective plug sealing surfaces and spaced openings.

6. A high-pressure flow control valve according to claim 1, wherein said cage member comprises a first cage member interfitted within a second cage member with said cage member internal passageway being defined therebetween.

7. A high-pressure flow control valve according to claim 6, wherein said second cage member includes a seat and said valve plug includes a sealing surface for engaging said seat.

8. A high-pressure flow control valve according to claim 1, wherein said valve plug restricted openings, said cage member inlet and outlet, said internal plug passageways, and said cage member internal passageway are sufficiently large so as to prevent plugging from any particulates entrained in the fluid.

* * * * *